United States Patent [19]

Baus

[11] Patent Number: 4,707,207

[45] Date of Patent: Nov. 17, 1987

[54] METHOD FOR PROCESSING AND APPLYING A PROTECTIVE FOIL

[76] Inventor: Heinz G. Baus, Wartbodenstrasse 35, CH-3626 Hünibach-Thun, Switzerland

[21] Appl. No.: 779,638

[22] Filed: Sep. 24, 1985

[30] Foreign Application Priority Data

Sep. 29, 1984 [DE] Fed. Rep. of Germany ....... 3435906

[51] Int. Cl.$^4$ .............................................. B32B 31/18
[52] U.S. Cl. ................... 156/252; 156/244.18; 156/252; 156/306.3; 156/309.9; 156/322; 156/344; 428/41; 428/43
[58] Field of Search .................... 156/252, 253, 244.18, 156/230, 306.3, 308.2, 309.9, 322, 324.4, 344; 428/43, 40, 41, 42

[56] References Cited

U.S. PATENT DOCUMENTS

| 2,070,600 | 2/1937 | Jenett . | |
| 3,031,359 | 4/1962 | Blank et al. | 428/41 |
| 3,085,024 | 4/1963 | Blackford | 428/43 |
| 3,183,116 | 5/1965 | Schaar | 156/230 |
| 3,503,835 | 3/1970 | Hermann | 428/41 |
| 3,674,590 | 7/1972 | Holman | 156/252 |
| 4,020,204 | 4/1977 | Taylor et al. | 428/41 |
| 4,380,564 | 4/1983 | Cancio et al. | 428/43 |
| 4,421,807 | 12/1983 | Clausing et al. | 428/41 |
| 4,465,729 | 8/1984 | Cancio et al. | 428/43 |
| 4,499,130 | 2/1985 | Questel et al. | 428/43 |
| 4,581,087 | 4/1986 | Johnson | 156/252 |

FOREIGN PATENT DOCUMENTS

| 0022664 | 1/1981 | European Pat. Off. . | |
| 2824811 | 12/1978 | Fed. Rep. of Germany | 428/41 |
| 142648 | 11/1980 | Japan | 156/252 |

Primary Examiner—Caleb Weston
Attorney, Agent, or Firm—Schwartz, Jeffery, Schwaab, Mack, Blumenthal & Evans

[57] ABSTRACT

A method and an apparatus are described for processing and applying a protective foil to a flat sheet made, more particularly of a thermoplastic synthetic material. The protective foil is used to protect the relatively soft surface of the sheet but, during further processing, difficulties arise in that parts of the surface must be freed of protective foil. In order to protect at least certain areas of the sheet as long as possible from external effects or damage, there is provided a protective foil which, before it is applied to the sheet or to a strip from which the sheet is subsequently produced, is formed with perforations. During further processing of the sheet, the parts of the foil corresponding to the areas of the sheet that are to be freed, are removed and the remainder is protected by the remaining parts of the protective foil.

9 Claims, 5 Drawing Figures

METHOD FOR PROCESSING AND APPLYING A PROTECTIVE FOIL

FIELD OF THE INVENTION

The invention relates to a method for processing and applying a protective foil to a sheet which is made, more particularly, of a thermoplastic material. The invention furthermore relates to an apparatus for the implementation of the above method and, finally, to a component containing a sheet provided with a protective foil.

THE PRIOR ART

U.S. Pat. No. 2,070,600 describes a method for coating sheets and other objects made of wood, metal or composite materials, etc.. To this end a thermoplastic mix is fed to an arrangement of rolls which is also used for applying the mix to the object to be coated. The layer thus applied remains permanently upon the object as a protective layer, thus protecting the surface thereof for its entire useful life. In this case the purpose is to obtain a permanent coating, the coating on the object being no longer detachable under normal conditions.

Sheets made out of a thermoplastic synthetic material are used in a very wide variety of fields and are subject to damage by scratches, or the like because their surfaces are relatively soft. Therefore, during production, such sheets are often provided with a suitable protective foil, but this presents problems during subsequent processing. For instance, if the sheet is to be fitted into a frame, the protective foil must first be removed or difficulties will arise if pieces of the foil remain between the frame and the sheet and such pieces can be removed only at considerable cost. Proper removal of the protective foil is particularly important in cases where the sheet must be sealed to, and firmly held by, the frame. This applies especially in connection with shower partitions in which the sheets of door or wall elements are usually made of transparent plastic and are surrounded and held by appropriate frame profiled sides. Lack of sealing between the sheets and frames affects the serviceability of the shower separation as a whole. If the protective foil is applied to the sheet after it has been fitted into the frame, in order to avoid damage during transportation and assembly, the application of the foil to the sheet mounted in the frame involves a not negligeable cost. It should be recalled that the lateral walls or doors of a shower partition vary greatly in dimensions, depending upon customer requirements, and stock keeping of protective foils is therefore costly. Finally, mention must also be made of the important amount of labour involved in the subsequent application of protective foils.

OBJECTS OF THE INVENTION

It is therefore an object of the present invention to provide a method which can be implemented at low cost and which will provide the greatest possible protection for the sheet, particularly during further processing. Production of the sheets may be carried out in the usual manner by means of conventional equipment such as extruders, arrangements of rolls, or the like, with little additional equipment being required in connection with the protective foil. The sheet must be protected, to the greatest possible extent, from the time that it is produced until it reaches the final consumer, but areas of the sheet which must be accessible for intermediate processing must be able to be exposed simply and without taking up too much time or labour.

In order to accomplish this purpose, it is proposed that, before being applied to the surface of the sheet, or to a strip of material from which the sheet is subsequently cut, the protective foil be provided with perforations. Thus, during further processing, parts of the foil may be removed from the sheet along the perforations, with the remainder of the foil remaining on the sheet.

The proposed method may be implemented at little cost and provides the greatest possible protection of the sheet from production to consumer. During further processing of the sheet, parts of the foil are removed from the sheet along the perforations, so that fittings, frame profiled sides or the like can be applied with no danger of serviceability being impaired by the foil or residual pieces thereof. In the meanwhile, the remainder of the sheet is protected by the foil; such remainder being removed completely, on site, only after all fittings, frames, or the like have been applied and the sheet is finally in place. According to the invention, the design of the perforations is such that the force required to detach a strip or a piece of the foil is less than that holding the foil to the sheet. In other words, only the desired amount of foil is removed from the sheet, while the remaining pieces or areas adhere to the sheet unchanged.

The method is preferably used in the case of sheets for shower partitions, especially since these require a tight seal between the frame and the sheet and optimal surface protection until they are installed on site in a shower or bath. Before the sheets, cut to size, are inserted into a frame, sections of the protective foil are removed from the edges, along the perforations, in a simple manner, but the remainder of the sheet remains protected from damage by surface scratches, especially while it is being fitted to the frame. The presently necessary precautions for subsequent protection of the sheets, and costly packing, are eliminated. On the other hand, the cost of providing the perforations is almost negligeable in practice. This is all the more so since, nowadays, sheets are usually produced by extrusion followed by rolling, and the application of a perforated protective foil to the still hot surface of an endless strip, prior to cutting to size, is accomplished with extremely little additional cost.

According to one particularly interesting feature, the perforations may be applied to the protective foil immediately before the foil is applied to the sheet or strip. The foil may be obtained from the suppliers in the form of conventional rolls, thus eliminating additional costs. Perforation is effected at the desired location, depending upon the size of the strip or sheet, and changes can be made without difficulty, being merely a matter of moving the perforating means, including perforation cutters or the like, to the required positions.

In order to ensure that the surface of the sheet or strip is not damaged by the perforations, it is proposed, according to an interesting embodiment, that the surface of the protective foil which is cut into by the perforating device be the surface that is applied to the surface of the sheet or strip. Although the foil is made of a relatively soft material, burrs may form, during perforation, on the side of the foil remote from the perforating device, and these burrs project from the surface of the foil to some extent. Accordingly, it is preferred that the surface of the foil which is smooth, i.e., devoid of burrs, be the one that is applied to the sheet or strip, not the outer surface containing the burrs. This is particularly important, since a continuously produced sheet or strip, made of an extrudable synthetic material may have a relatively soft surface which could easily be damaged by such burrs. The proposed arrangement of the protective foil upon the sheet or plate is a surprisingly simple way of avoiding such damage.

According to a preferred embodiment, protective foils are applied to both sides or surfaces of the sheet or strip, but it should be remembered that one side only may be provided with such a perforated protective foil. This applies, for example, to sheets which have a roughened surface where scratches and damage need not be taken into account; in this case only the surface of the sheet, which has a smooth surface structure, need be protected with the foil. On the other hand, it has been found highly desirable to protect both sides or surfaces of the sheet with a protective foil, in the manner taught by the invention, especially since the production cost involved can be kept surprisingly low.

According to another preferred embodiment, the length ratio of the holes to the distances between adjacent holes of the perforations is at least as great or greater than 2:1, preferably 3:1. Predetermination of this length ratio ensures, in a particularly simple manner, that when a piece of the protective foil is removed, only the desired piece is detached, while the remainder still adheres to the sheet. Thus the force required to tear off the piece of foil is less than the force resisting removal of the remainder of the protective foil from the sheet.

In another preferred embodiment, the number of holes provided in the longitudinal direction of the perforations is such that the distances between the holes is as preselected. By means of the perforations, therefore, the protective foil is divided into bands so that, during processing of the sheet, individual bands may be removed as desired, for the application of frame profiled sides or the like. The distance between the perforations, and thus the width of the bands, may be preselected according to requirements, widths of about 30 to 40 mm having been found particularly advantageous in practice.

According to another preferred embodiment, a series of perforations is provided in the transverse direction of the protective foil at a predetermined distance from each other. Here again, there are no special problems in applying the perforations to the foil. In addition to the above-mentioned longitudinal perforations, the protective foil is perforated, preferably, into a plurality of rectangles or squares and, during further processing of the sheet, individual rectangles or squares can be detached. This arrangement is particularly useful when only small areas of the plate need be exposed, for example for fittings, or if all four edges of the sheet are to be mounted in a frame.

The invention also relates to an apparatus for the implementation of the method which can be produced at a low cost in materials and labour. Having few parts, taking up little space, and being light in weight, the apparatus provides reliable perforations of the protective foil, on the one hand and, on the other hand, unites the perforated foil functionally with the sheet or a corresponding strip. To this end, it is proposed to provide a perforating device comprising cutters or the like and to provide at least one pressure roller in order to unite the perforated protective foil with the strip or sheet.

The apparatus contains, in known fashion, an arrangement of rolls following an extruder or the like, for delivering a strip. For the purpose of applying the perforated protective foil to the, preferably, still hot sheet, at least one pressure roller is provided, the protective foil being passed, together with the strip, through a gap or nip between the pressure rollers. The still relatively soft surface, and the relatively hot strip, ensure particularly satisfactory adhesion of the perforated protective foil to the surface of the strip. It is advantageous, in this connection, to arrange the perforating device so that any burrs arising during perforation be located outwardly on the side of the protective foil which is remote from the perforating device. Damage to the strip or sheet by such burrs, or the like, is thus prevented in a surprisingly simple manner.

It is also desirable to provide two pressure rollers and to feed the strip with a protective foil on each side thereof, jointly into the nip between the pressure rollers. Thus each surface of the strip is provided, in a single operation, with a protective foil. Moreover, the arrangement of rolls, used to produce the strip, and the pressure rollers may be so close together that the residual heat in the strip just produced be usable to attach the protective foils. This eliminates additional heating devices and effects a considerable reduction in overall power cost. In addition to this, the pressure applied by the rollers may be kept very low, thus preventing any damage to, or deformation of, the surface layer of the strip or sheet thus produced.

In one particular embodiment, the perforating device is arranged in such a manner that the perforations are applied to the internal surface of the protective foil, such internal surface subsequently coming to rest upon the surface of the strip. This prevents damage to the strip or plate occasioned by burrs or the like. To this end, it is desirable to provide the perforating device with a deflecting roller, the latter being located in the immediate vicinity of the strip whereas the perforating device is arranged on the side of the deflecting roller remote from the strip. The deflecting roller definitely guides the perforated protective foil to the nip of the pressure rollers, or pair of pressure rollers whereas, on the other side, the deflecting roller, in conjunction with the perforating device, reliably ensures perforation of the protective foil.

The invention furthermore relates to a component, more particularly to a wall or door element of a shower partition, comprising a sheet, the surface of which is covered with a protective foil, and a frame, fittings, or the like. The component can be obtained at low cost, the surface of the sheet being protected as far as possible, while the application of the frame, fittings, or the like is not rendered more difficult by the protective foil. A stable, reliable and, above all, a sealed joint is achieved between the sheet, the frame and/or the fittings. To this end, it is proposed that the protective foil be present only in the unencumbered areas of the sheet, whereas it is removed along perforations wherever frames, fittings or the like are to be applied. It is thus possible to produce the component at low cost, especially since the sheet, including the protective foil can be produced in a continuous process. Before the sheet is inserted into the frame, or fittings are applied to the sheet, parts of the protective foil are removed from the edges, and from any other necessary locations, along the relevant perforations. This eliminates any subsequent application of protective foil to the finished component, which has hitherto been the usual procedure and required a considerable amount of labour. Furthermore, even when the frame or fittings are applied, the surface of the sheet, except where the foil has been removed, is still shielded by the remaining foil, the latter being removed from the component only after it has finally been installed on site.

In one significantly interesting embodiment, the protective foil applied to the sheet in the component is divided, by the perforations, into bands or preferably rectangular or square areas which may be removed from the surface without difficulty. Originally, the foil also covered the parts of the surface covered by the frame or fittings, but was removed from these areas while the component was being produced.

BROAD DESCRIPTION OF THE INVENTION

According to one aspect of the invention, there is provided a method of processing a protective foil, of applying it over at least one surface of a sheet made more particularly of thermoplastic material and having a lengthwise and a transverse direction, and of using the thus produced surface-protected sheet. The method involves essentially the cutting of spaced perforations through the protective foil, which perforations are aligned in at least one of the two directions mentioned above and define narrow parallel bands extending along the said at least one direction; the then applying of the protective foil over at least one surface of the sheet to be protected and then, in use, the removal of at least a selected one of the bands by pulling it away from the sheet, the unselected ones of the bands then remaining applied to the sheet.

According to another aspect, there is provided an apparatus for making a sheet of thermoplastic synthetic material covered with a protective foil over at least one of its surface, the apparatus comprising means capable of producing a strip of indefinite length and made of the aforesaid synthetic material; perforating means which includes a perforating device; at least one protective foil fed to the perforating device so that spaced perforations may be made through the foil; pressure roller means into which both the strip and the protective foil are simultaneously fed so that the foil may be applied over the strip, and a cutting device for cutting the strip and foil applied thereto, as they come out of the pressure roller means, into sheets of predetermined length.

According to a further aspect of the invention, there is provided a component which comprises a closed frame defined by interconnected side members delimiting an enclosure therebetween. A sheet is mounted in such a frame with its edges secured to the frame side members beyond the enclosure. A protective foil removably covers at least one full side of the sheet and is formed with spaced perforations along at least the edges of the sheet, these perforations defining borders of the protective foil, these borders extending beyond the enclosure prior to the sheet being secured to the frame so that these borders may be torn off and removed from the protective foil before the sheet is fixed to the frame side members. The protective foil then covers the enclosure extent of the sheet which is the portion to be protected.

A description now follows of the abovementioned aspects of the invention, as preferred embodiments, having reference to the appended drawing wherein.

Figure 1:
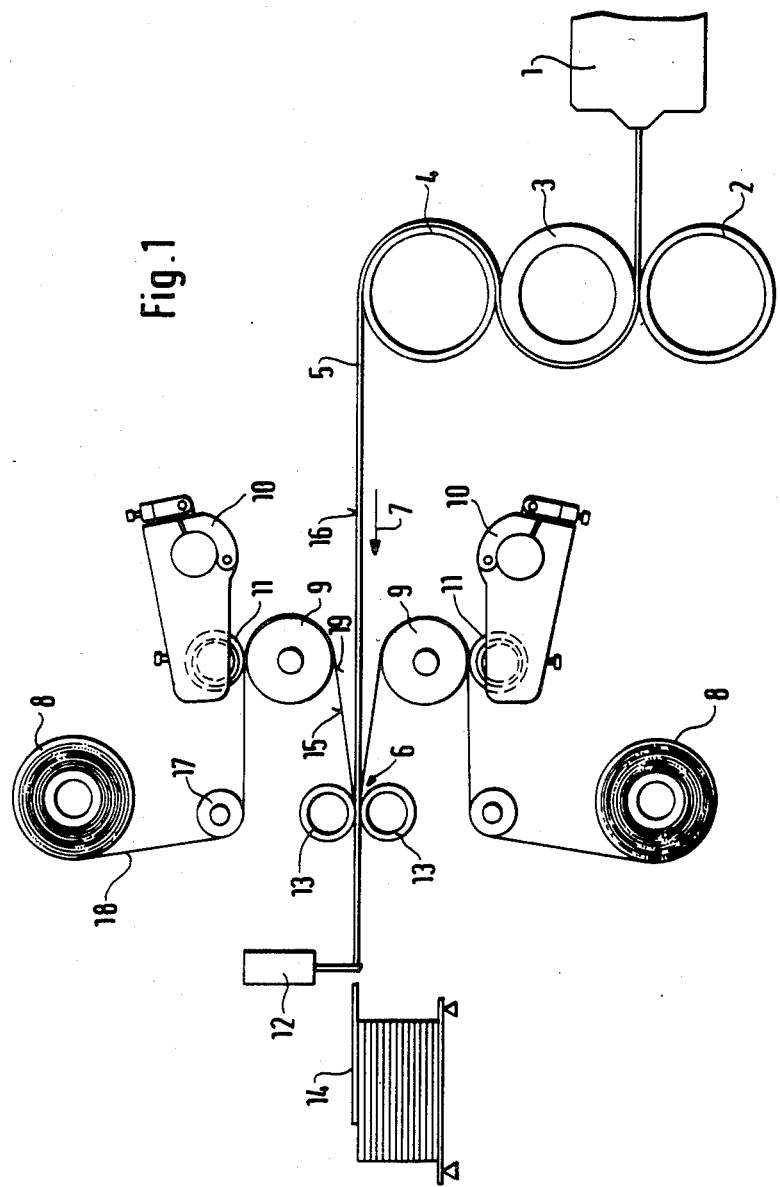
FIG. 1 is a diagrammatic illustration of an apparatus for the implementation of the method.

The apparatus of FIG. 1, for the implementation of the method, comprises an extruder 1 feeding into an arrangement of rolls supplying a strip 5 of thermoplastic synthetic material. The arrangement of rolls comprises three rolls arranged vertically one above the other, namely a lower pressure roll 2, a central embossing roll 3, and an upper smooth roll 4. Strip 5 of synthetic material thus produced is taken horizontally from smooth roll 4. The strip 5 travels in the direction of arrow 7 and is provided, in a nip 6 between two pressure rollers 13, with a protective foil 18 on each side, foil 18 being unwound from reels 8. The speed at which the protective foils leave the reels 8, the extruder 1 and the arrangement of rolls 2, 3 and 4, are matched to cooperate. Strip 5 is passed, together with the two protective foils 18, into the nip 6, the necessary pressure being applied by the pressure rollers 13.

In the illustrated embodiment, strip 5 is provided with a protective foil 18 on each surface, i.e. upon the upper and the lower surface. The pair of pressure rollers 13 is set up in the vicinity of the arrangement of rolls 2, 3 and 4 in such a manner that the residual heat in the strip 5 can be used in applying the foils 18. The two foils 18 and the strip 5 are fed simultaneously into the nip or roller gap 6. As a result of the paired arrangement of rollers 13 and the use of the residual heat, the pressure required is relatively low.

By means of a device 10, an initially unmarked protective foil 18 is perforated before being applied to the strip 5. To this end, device 10 contains suitable perforating means 11 or the like that can be a perforation cutting roll and the perforations may be applied, as desired, in the longitudinal and/or transverse direction of the foil.

The two perforating devices 10, the rollers 13, etc., and deflecting cylinders 9, are of the same design and are arranged in the vicinity of strip 5. It will be noted that the perforations are applied to the internal surfaces 19 of the protective foils 18, since it is these surfaces which are applied directly to the surfaces 16 of the strip 5. This is because, when the very thin foil 18 is perforated, burrs or projections occur on the external surface 15 as a result of the cutting means, or the like, penetrating into the internal surfaces 19. If such burrs were pressed onto the still relatively hot surface of strip 5 by means of the pressure rollers 13, it would be almost impossible to avoid damage to the surface of the strip 5 and thus to the sheet being produced. Furthermore, the shown arrangement of deflecting cylinders 9, perforating devices 10, and pressure rollers 13, provides an extremely compact and space-saving design. The deflecting cylinders 9, perforating devices, pressure rollers 13 and possibly feed rolls 17, are arranged in a common housing, not shown here for the sake of clarity. It should be noted that all rolls, i.e. those supplying the protective foil both from above and below, are arranged in a common machine frame. By means of a subsequent cutting device 12, strip 5 and protective foils 18, are cut into sheets 14 of the desired size in a manner known per se.

Figure 2:
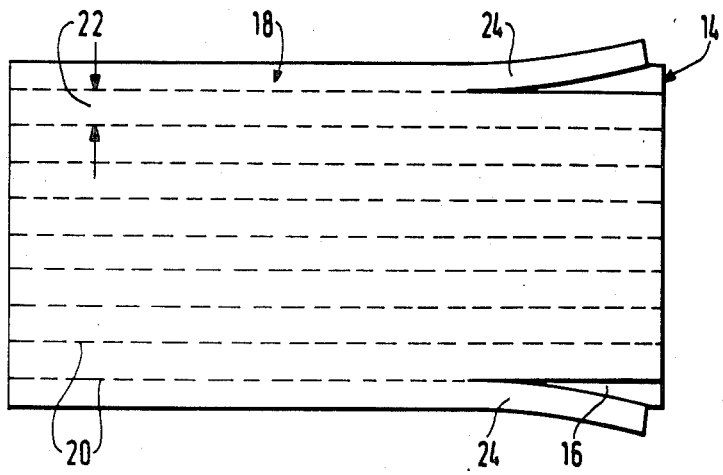
FIG. 2 is a plan view of a sheet provided with a protective foil divided into strips by a number of perforations.

FIG. 2 illustrates a sheet 14 including a portion of strip 5 to the surface 16 of which a protective foil 18 has been applied. The foil 18 has a series of perforations 20 running in the longitudinal direction of the sheet 14 and at a predetermined distance from each other. The perforations 20 therefore divide the foil 18 into a series of bands 24. The two outer bands are shown partly removed, in the drawing.

Figure 3:
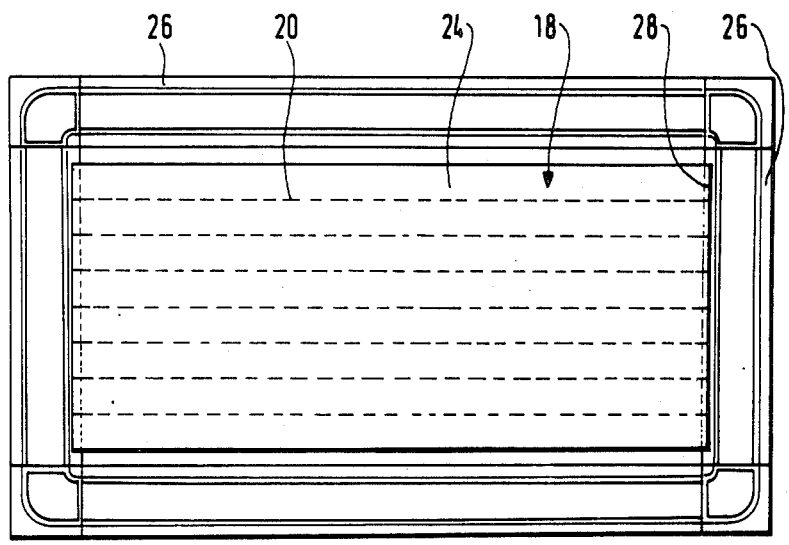
FIG. 3 is a plan view of a component fitted with a sheet according to FIG. 2.

FIG. 3 illustrates a component comprising a frame 26 made out of four profiled rails, forming frame sides, arranged at right angles to each other. The sheet 14 described in conjunction with FIG. 2 is incorporated, in known fashion, into frame 26, the above-mentioned outer bands of the foil 18 having been previously removed. Ends 28 of the protective foil 18 are laid over the profiled rails shown on the left and right-hand sides of the drawing.

Figure 4:
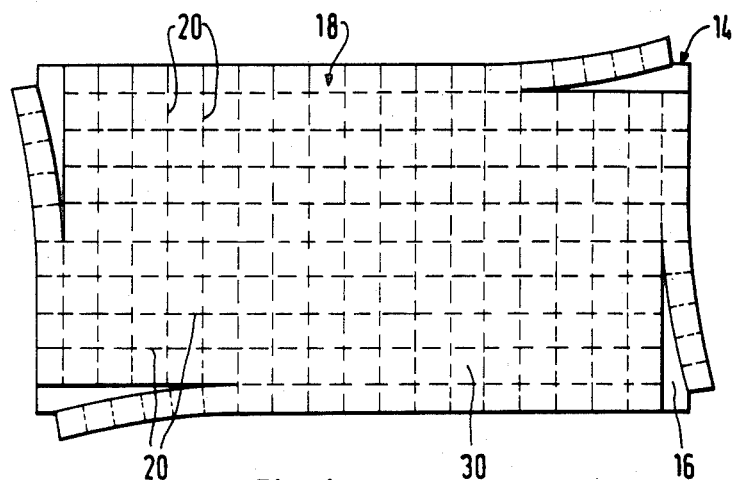
FIG. 4 is a plan view of a sheet wherein the protective foil is divided into squares, by perforations.

FIG. 4 illustrates an embodiment of the sheet 14 in which the protective foil 18 is further provided with transverse perforations. As a result of these longitudinal and transverse perforations, the bands 24 (FIGS. 2 and 3) of the protective foil 18 are divided into squares 30. There is no need to point out that the distances between the longitudinal and transverse perforations may be varied as required, and that the perforations 20 may also form rectangles 30, in the bands 24.

Figure 5:
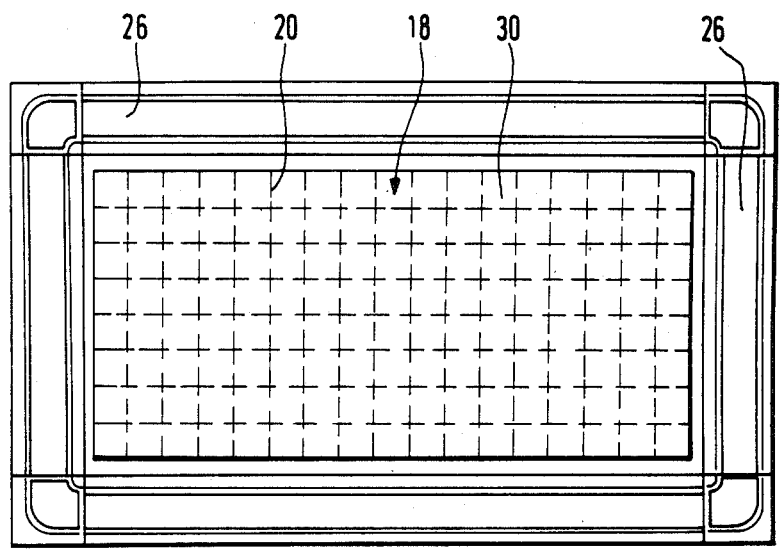
FIG. 5 is a plan view of a component fitted with a sheet according to FIG. 4.

Finally, FIG. 5 shows a component having a sheet made according to FIG. 4. Before inserting sheet 14 into frame 26, strips of protective foil are removed from the short and the long sides thereof. The frame therefore lies, as required, tightly directly against the surface of the sheet. This ensures, in a surprisingly simple manner, on the one hand, watertight and secure attachment of the sheet 18 to the frame 26 and, on the other hand, reliable protection of the sheet 18, even during further processing until it reaches the ultimate consumer.

I claim:

1. A method of processing a protective foil, of applying said foil over at least one surface of a sheet made of thermoplastic synthetic material and having a lengthwise and a transverse direction, and of using said thus surface-protected sheet, said method comprising:
    cutting spaced perforations through said protective foil with said perforations aligning in at least one of said directions and defining narrow parallel bands extending along said at least one direction;
    then applying said protective foil over said at least one surface of said sheet to be protected by pressing said protective foil directly against said one surface immediately after production of said sheet while said thermoplastic material is still warm without interposition of an adhesive between the protective foil and the sheet of thermoplastic material and then, in use,
    removing at least a selected one of said bands by pulling said selected band away from said sheet while unselected ones of said bands remain applied to said sheet.

2. A method as claimed in claim 1, comprising perforating said protective foil immediately prior to applying said foil over said sheet.

3. A method of preparing a sheet provided over at least one surface with a protective foil, said sheet having a lengthwise and a transverse direction, said method comprising:
    cutting spaced perforations through said protective foil from a surface thereof which is subsequently applied over said at least one surface of said sheet with said perforations aligning in at least one of said directions and defining narrow parallel bands extending along said at least one direction;
    then applying the surface of said protective foil from which said perforations are cut over said at least one surface of said sheet to be protected and then, in use,
    removing at least a selected one of said bands by pulling said selected band away from said sheet while unselected ones of said bands remain applied to said sheet.

4. A method as claimed in claim 3, simultaneously applying, in a similar manner, a second perforated protective foil over the other surface of said sheet whereby said sheet surfaces are both protected.

5. A method as claimed in claim 4, wherein said perforations are cut along preselected equal lengths and are separated equal distances from each other, the ratio of said length to said distance being at least 2:1.

6. A method as claimed in claim 4, wherein said perforations are cut along preselected equal lengths and are separated equal distances from each other, the ratio of said length to said distance being at least 3:1.

7. A method as claimed in claim 3, comprising cutting said spaced perforations to align in both of said directions whereby said narrow bands extend at right angles and are each divided into squares or rectangles.

8. A method as claimed in claim 7, simultaneously applying, in a similar manner, a second perforated protective foil over the other surface of said sheet whereby said sheet surfaces are both protected.

9. A method as claimed in claim 7, wherein said perforations are cut along preselected equal lengths and are separated equal distances from each other, the ratio of said length to said distance being at least 2:1.

* * * * *